United States Patent
Zhang et al.

(10) Patent No.: US 9,872,026 B2
(45) Date of Patent: Jan. 16, 2018

(54) SAMPLE ADAPTIVE OFFSET CODING

(71) Applicant: Intel Corporation, Santa Clara, CA (US)

(72) Inventors: Ximin Zhang, San Jose, CA (US); Sang-Hee Lee, Santa Clara, CA (US); Dmitry E. Ryzhov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 14/737,790

(22) Filed: Jun. 12, 2015

(65) Prior Publication Data

US 2016/0366413 A1    Dec. 15, 2016

(51) Int. Cl.

| | |
|---|---|
| *H04B 1/66* | (2006.01) |
| *H04N 19/132* | (2014.01) |
| *H04N 19/114* | (2014.01) |
| *H04N 19/124* | (2014.01) |
| *H04N 19/13* | (2014.01) |

(Continued)

(52) U.S. Cl.
CPC ......... *H04N 19/132* (2014.11); *H04N 19/114* (2014.11); *H04N 19/117* (2014.11); *H04N 19/124* (2014.11); *H04N 19/13* (2014.11); *H04N 19/139* (2014.11); *H04N 19/142* (2014.11); *H04N 19/146* (2014.11); *H04N 19/159* (2014.11); *H04N 19/172* (2014.11); *H04N 19/177* (2014.11); *H04N 19/179* (2014.11); *H04N 19/197* (2014.11);
(Continued)

(58) Field of Classification Search
CPC .. H04N 19/132; H04N 19/159; H04N 19/117; H04N 19/146; H04N 19/82; H04N 19/172; H04N 19/52; H04N 19/197; H04N 19/142; H04N 19/177; H04N 19/577; H04N 19/139; H04N 19/114; H04N 19/13; H04N 19/124; H04N 19/179
See application file for complete search history.

(56) References Cited

U.S. PATENT DOCUMENTS

2013/0336593 A1 * 12/2013 Yamamura ........... H04N 19/149
                                                             382/248
2014/0072033 A1    3/2014 Chuang et al.
2014/0286396 A1    9/2014 Lee et al.

FOREIGN PATENT DOCUMENTS

EP        3107298 A1 * 12/2016    ............ H04N 19/70
KR     20140127400       11/2014
(Continued)

OTHER PUBLICATIONS

International Search Report and Written Opinion for International Patent Application No. PCT/US2016/030744, dated Aug. 12, 2016.

*Primary Examiner* — Tat Chio
(74) *Attorney, Agent, or Firm* — Green, Howard & Mughal, LLP

(57) ABSTRACT

Techniques related to video coding with sample adaptive offset coding are discussed. Such techniques may include setting a sample adaptive offset coding flag for a picture of a group of pictures based at least in part on a comparison of an available coding bit limit of the picture to a first threshold and a quantization parameter of the picture to a second threshold. In some examples, such techniques may also include setting the sample adaptive offset coding flag based on a coding structure associated with coding the group of pictures.

25 Claims, 6 Drawing Sheets

(51) Int. Cl.
*H04N 19/139* (2014.01)
*H04N 19/142* (2014.01)
*H04N 19/177* (2014.01)
*H04N 19/179* (2014.01)
*H04N 19/196* (2014.01)
*H04N 19/52* (2014.01)
*H04N 19/577* (2014.01)
*H04N 19/159* (2014.01)
*H04N 19/172* (2014.01)
*H04N 19/117* (2014.01)
*H04N 19/146* (2014.01)
*H04N 19/82* (2014.01)

(52) U.S. Cl.
CPC ........... *H04N 19/52* (2014.11); *H04N 19/577* (2014.11); *H04N 19/82* (2014.11)

(56) References Cited

FOREIGN PATENT DOCUMENTS

| | | |
|---|---|---|
| KR | 20150047379 | 5/2015 |
| WO | 2013109879 | 7/2013 |

\* cited by examiner

SAMPLE ADAPTIVE OFFSET CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In some approaches, such as the High Efficiency Video Coding (HEVC) standard, sample adaptive offset (SAO) techniques may be used. For example, SAO filtering may be performed after deblock filtering to provide better picture reconstruction by applying offsets. SAO filtering may, for example, improve picture quality, reduce banding artifacts, and reduce ringing artifacts. In some contexts, the complexity of SAO coding is relatively small compared to other coding modules. However, in some contexts, SAO coding may become the bottleneck of the coding pipeline. Moreover, although the amount of additional bits used by SAO is a relatively small percentage of the overall bitstream and usually will not affect rate control under moderate to high bitrate applications, it may cause problem in low bitrate coding It may be advantageous to perform effective and efficient compression of video data in all contexts including those that may be negatively impacted by SAO coding. It is with respect to these and other considerations that the present improvements have been needed. Such improvements may become critical as the desire to compress video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
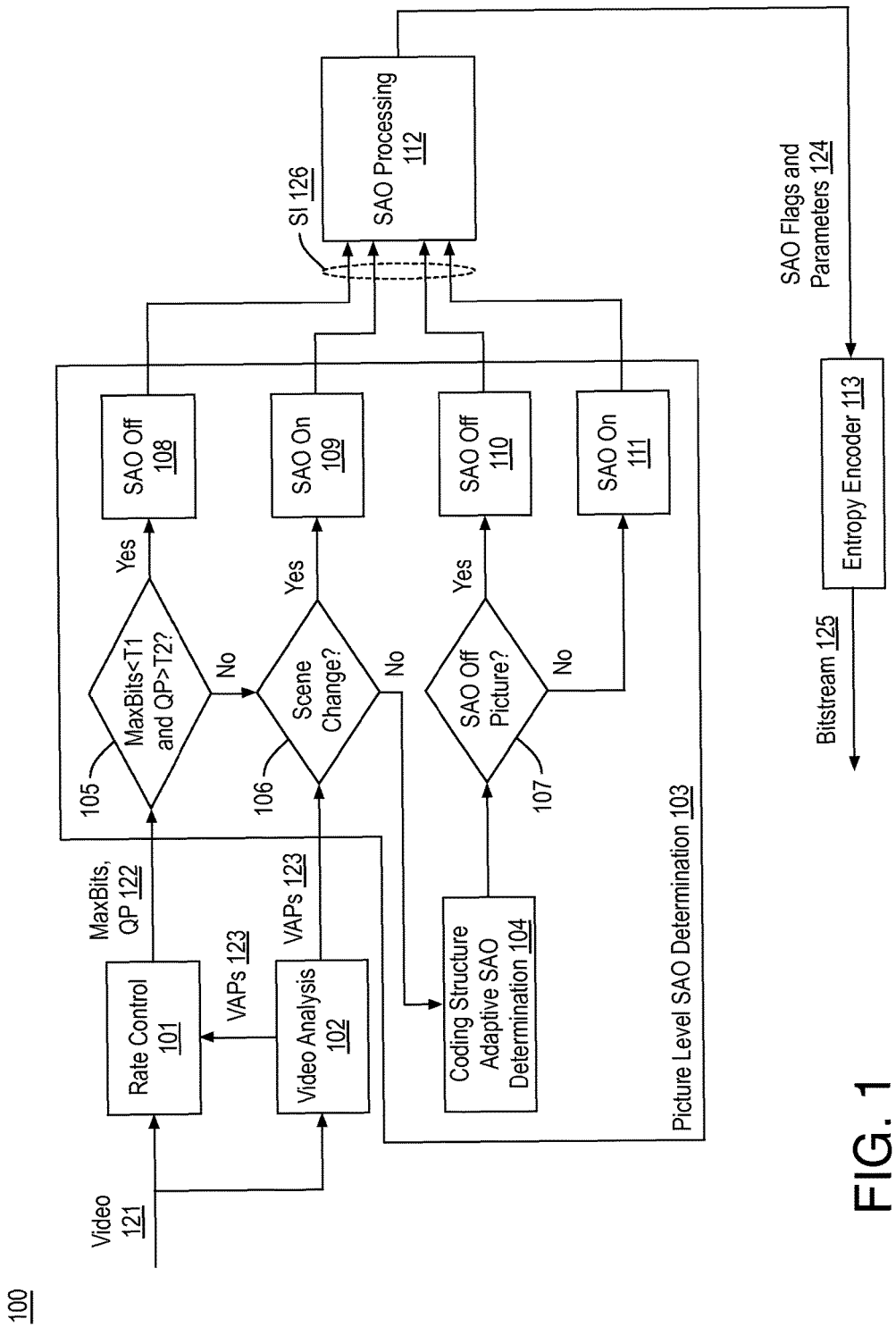
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to providing picture level and/or coding unit level sample adaptive offset skip decisions.

As described above, it may be advantageous to perform effective and efficient compression of video data. Also as discussed, in some video codec systems, sample adaptive offset (SAO) techniques may be used. In some embodiments discussed herein, video coding may include determining, for a picture of a group of pictures, an available coding bit limit and a quantization parameter. Based on a comparison of the available coding bit limit to a first threshold and the quantization parameter to a second threshold, a sample adaptive offset coding flag for the picture may be set. For example, if the available coding bit limit is not greater than the first threshold and the quantization parameter is not less than the second threshold, the sample adaptive offset coding flag for the picture may be set to off such that SAO coding may be skipped for the current picture. If the available coding bit limit is not less than the first threshold or the quantization parameter is not greater than the second threshold, additional techniques based on the picture type of the picture, the coding structure of the group of pictures, and/or other considerations may be used to set the offset coding flag for the picture. Furthermore, for pictures with offset coding flags set to on (e.g., code with SAO), coding unit level decision may be made for skipping SAO coding or copying previously determined SAO parameters. Such additional picture level SAO decision techniques and coding unit level skip decision techniques are discussed further herein.

Such techniques may provide SAO picture level and/or coding unit level skip decisions that reduce SAO processing and achieve similar subjective quality with respect to full SAO coding. For example, the techniques discussed herein may provide picture level adaptive SAO on/off decisions to adaptively enable and disable SAO for the whole picture based on an available coding bit limit of the picture, a quantization parameter of the picture, the picture type, the structure of the group of pictures that includes the picture, the interval between SAO enabled pictures, and the like. Such techniques may avoid memory underflow and/or unnecessary (e.g., from a subjective quality perspective) SAO processing.

FIG. 1 is an illustrative diagram of an example system 100 for providing video coding, arranged in accordance with at least some implementations of the present disclosure. As shown in FIG. 1, system 100 may include a rate control module 101, a video analysis module 102, a picture level sample adaptive offset (SAO) determination module 103, a sample adaptive offset (SAO) processing module 112, and an entropy encoder 113. Also as shown, picture level SAO determination module 103 may include a coding structure adaptive SAO determination module 104, a comparator module 105 (e.g., labeled MaxBits<T1 and QP>T2?), a scene change determination module 106 (e.g., labeled Scene Change?), an SAO picture level evaluation module 107 (e.g., labeled SAO Off Picture?), and SAO setting modules 108-111 (e.g., labeled SAO Off or SAO On).

Also as shown, rate control module 101 and video analysis module 102 may receive video 121. System 100 may provide, for example, video compression and system 100 may be a video encoder implemented via a computer or computing device or the like. For example, system 100 may generate a bitstream 125 that is compatible with a video compression-decompression (codec) standard such as the H.264/MPEG-4 advanced video coding (AVC) standard, the MPEG-2 coding standard, the high efficiency video coding (HEVC) standard, the VP8 standard, the VP9 standard or the like. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity in presenting the described techniques.

As discussed, rate control module 101 and video analysis module 102 may receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. Furthermore, video 121 may include any number of video frames, sequences of video frames, pictures, groups of pictures, or the like. Techniques discussed herein are discussed with respect to pictures and groups of pictures for the sake of clarity of presentation. However, such pictures and groups of pictures may be characterized as frames, video frames, sequences of frames, video sequences, or the like.

As shown in FIG. 1, video analysis module 102 may determine, for individual pictures of video 121 and/or for groups of pictures of video 121, video analysis parameters 123. Video analysis module 102 may determine video analysis parameters 123 using any suitable technique or techniques. Furthermore, video analysis parameters 123 may include any suitable video analysis parameters or data such as picture variance, spatial complexity, temporal correlation, and the like. For example, video analysis module 102 may perform downsampling of and/or analysis pictures of video 121 to generate video analysis parameters 123. As shown, video analysis parameters 123 may be used by rate control module 101 and scene change determination module 106 as discussed further herein.

Rate control module 101 may receive video 121 and video analysis parameters 123 and rate control module 101 may determine, for individual pictures of video 121, an available coding bit limit and a quantization parameter. For example, rate control module 101 may provide a signal 122 including the available coding bit limit (e.g., MaxBits) and the quantization parameter (e.g., QP) to comparator module 105. For example, the available coding bit limit may be a maximum amount of allowed bits for coding the picture. The available coding bit limit may be characterized as maximum bits, maximum coding bits, a maximum available coding bit limit or the like for the current picture. Furthermore, the quantization parameter may be a quantization parameter for compressing ranges of values to particular values for a picture. The quantization parameter may be determined using any suitable technique or techniques.

The available coding bit limit for the current picture may also be determined using any suitable technique or techniques. For example, the available coding bit limit may be based on current buffer conditions and/or an average target rate for coding each picture of video 121. In some examples, the available coding bit limit, for a current picture of video 121, may be a sum of a hypothetical reference decoder buffer fullness (e.g., a current buffer condition) associated with an immediately prior encode picture and an average target rate for each picture of the group of pictures. For example, the available coding bit limit may be determined as shown in Equation (1):

$$\text{MaxBits}[N] = \text{buffer\_fullness}[N-1] + T \quad (1)$$

where MaxBits may be the available coding bit limit, buffer_fullness may be the buffer fullness of a hypothetical reference decoder, N may indicate the current picture, N−1 may indicate a previous encode picture (e.g., in an encode order), and T may be an average target rate for each picture of video 121. For example, buffer_fullness[N−1] may be a hypothetical reference decoder (HRD) buffer fullness after picture N−1 is coded such that picture N−1 may be an immediately prior encode picture with respect to the current picture.

As shown, picture level SAO determination module 103 (e.g., via comparator module 105) may receive the available coding bit limit and the quantization parameter for the current picture via signal 122. Comparator module 105 may determine a picture level SAO decision based on the available coding bit limit and the quantization parameter for the current picture. In some examples, comparator module 105 may compare the available coding bit limit to a first threshold and the quantization parameter to a second threshold. If the available coding bit limit is less than the first threshold (e.g., or less than or equal to or not greater than) and the quantization parameter is greater than the second threshold (e.g., or greater than or equal to or not less than), comparator module 105 may provide a signal to SAO setting module 108 to set a sample adaptive offset (SAO) coding flag for the current picture to off based on the received signal. Furthermore, SAO setting module 108 may provide the SAO coding flag for the current picture to SAO processing module 112 via signal 126, which may include skip indicators (SI). For example, the skip indicators may indicate whether a picture of video 121 is to skip SAO (e.g., an SAO coding flag for the picture is set to off or skip or the like) or not skip SAO (e.g., an SAO coding flag for the picture is set to on or non-skip or the like). For example, the skip indicators may be provided in a slice header of bitstream 125. For example, setting SAO processing to skip based on the comparison of the available coding bit limit to the first threshold and the quantization parameter to the second threshold may prevent buffer underflow for one-pass coding implementations.

As discussed, the available coding bit limit may be compared to a first threshold via comparator module 105. The first threshold may be any suitable value and may be characterized as an available coding bit limit threshold, a maximum available coding bit limit threshold, or the like. In some examples, the first threshold may be an adaptive threshold. For example, the first threshold may be adaptive based on a picture resolution of the current picture such that the higher the resolution of the current picture, the higher the value of the first threshold. The first threshold may be adapted based on the resolution of the current picture using any suitable technique or techniques. In some examples, the first threshold may be determined as a product of a constant value and a total number of largest coding units in the current picture.

Also as discussed, the quantization parameter may be compared to a second threshold via comparator module 105. The second threshold may be any suitable value and may be characterized as a quantization parameter threshold or the like. In some examples, the second threshold may be a constant value. For example, the second threshold may be a value of about 46 to 51. For example, in AVC and HEVC coding contexts, the available quantization parameter may range from 1 to 51 such that the second threshold is a relatively high quantization parameter threshold.

As discussed, if the available coding bit limit is less than the first threshold (e.g., or less than or equal to or not greater than) and the quantization parameter is greater than the second threshold (e.g., or greater than or equal to or not less than), comparator module 105 may provide a signal to SAO setting module 108 to set a sample adaptive offset (SAO) coding flag for the current picture to off based on the received signal.

If the available coding bit limit is greater than or equal to the first threshold (e.g., or greater than or not less than) or the quantization parameter is less than or equal to the second threshold (e.g., or less than or not greater than), comparator module 105 may provide a signal to scene change determination module 106. Based on receiving the signal from comparator module 105, scene change determination module 106 may determine whether the current picture is a scene change picture (e.g., whether the current picture is associated with a scene change in the content represented by video 121). Scene change determination module 106 may determine whether the current picture is a scene change picture using any suitable technique or techniques. In some examples, scene change determination module 106 may determine whether the current picture is a scene change picture based on a comparison of the temporal complexity of the current picture (e.g., as determined via video analysis module 102) to the average temporal complexity of any number of previous pictures. For example, if the temporal complexity of the current picture is greater than the average temporal complexity by a threshold amount (e.g., the difference between the temporal complexity of the current picture and the average temporal complexity is greater than a threshold) or by a particular factor (e.g., the ratio of the temporal complexity of the current picture to the average temporal complexity is greater than a threshold) or the like, the current picture may be determined to be a scene change picture.

If the current picture is determined to be a scene change picture, scene change determination module 106 may provide a signal to SAO setting module 109 to set a sample adaptive offset (SAO) coding flag for the current picture to on based on the received signal. Furthermore, SAO setting module 109 may provide the SAO coding flag for the current picture to SAO processing module 112 via signal 126, which may include skip indicators (SI) as discussed with respect to SAO setting module 108.

If the current picture is determined to not be a scene change picture, scene change determination module 106 may provide a signal to coding structure adaptive SAO determination module 104. Based on receiving the signal from scene change determination module 106, coding structure adaptive SAO determination module 104 may determine whether to skip SAO coding at the picture level or to perform SAO coding at the picture level for the current picture based on a coding structure associated with the group of pictures including the current picture as is discussed further below.

Based on the determination as to whether the current picture is an SAO skip picture (e.g., SAO processing is to be skipped) or an SAO non-skip picture (e.g., SAO processing is to be performed), coding structure adaptive SAO determination module 104 may provide a signal to SAO picture level evaluation module 107. If the signal indicates the current picture is an SAO skip picture, SAO picture level evaluation module 107 may provide a signal to SAO setting module 110 to set a sample adaptive offset (SAO) coding flag for the current picture to off based on the received signal. Furthermore, SAO setting module 110 may provide the SAO coding flag for the current picture to SAO processing module 112 via signal 126, which may include skip indicators (SI) as discussed herein. If the signal indicates the current picture is an SAO non-skip picture, SAO picture level evaluation module 107 may provide a signal to SAO setting module 111 to set a sample adaptive offset (SAO) coding flag for the current picture to on based on the received signal. Furthermore, SAO setting module 111 may provide the SAO coding flag for the current picture to SAO processing module 112 via signal 126, which may include skip indicators (SI) as discussed herein.

As discussed, coding structure adaptive SAO determination module 104 may determine whether a current picture is an SAO skip picture or an SAO non-skip picture. As discussed, in some examples, coding structure adaptive SAO determination module 104 may be initiated by a signal received via scene change determination module 106. In other examples, such scene change picture determination processing may be skipped and coding structure adaptive SAO determination module 104 may determine whether a current picture is an SAO skip picture or an SAO non-skip picture based on a signal received from comparator module 105 or another module of picture level SAO determination module 103.

Coding structure adaptive SAO determination module 104 may determine whether a current picture is an SAO skip picture or an SAO non-skip picture using any suitable technique or techniques. In some examples, coding structure adaptive SAO determination module 104 may determine whether the current picture is an Intra-picture and, if so, coding structure adaptive SAO determination module 104 may set the current picture as an SAO non-skip picture.

In some examples, system 100 may implement video coding with hierarchical B-structure in use. In such examples, coding structure adaptive SAO determination module 104 may determine the picture type of the current picture and, if the current picture is a non-reference B-picture (e.g., a B-picture not being used to code any other pictures of a group of pictures), coding structure adaptive SAO determination module 104 may set the current picture as an SAO skip picture. In some examples, such non-reference B-pictures may be characterized as B2-pictures. Furthermore, in such examples, all other hierarchical B-structure picture types (e.g., I-pictures, B0-pictures, B-pictures, and B1 pictures) may be set as SAO non-skip pictures.

In other examples of with hierarchical B-structure in use, coding structure adaptive SAO determination module 104 may determine the picture type of the current picture and, if the current picture is a low level B-picture (e.g., a B1-picture or a B2-picture), coding structure adaptive SAO determination module 104 may set the current picture as an SAO skip picture. Furthermore, in such examples, all other hierarchical B-structure picture types (e.g., I-pictures, B0-pictures, and B-pictures) may be set as SAO non-skip pictures.

Figure 2:
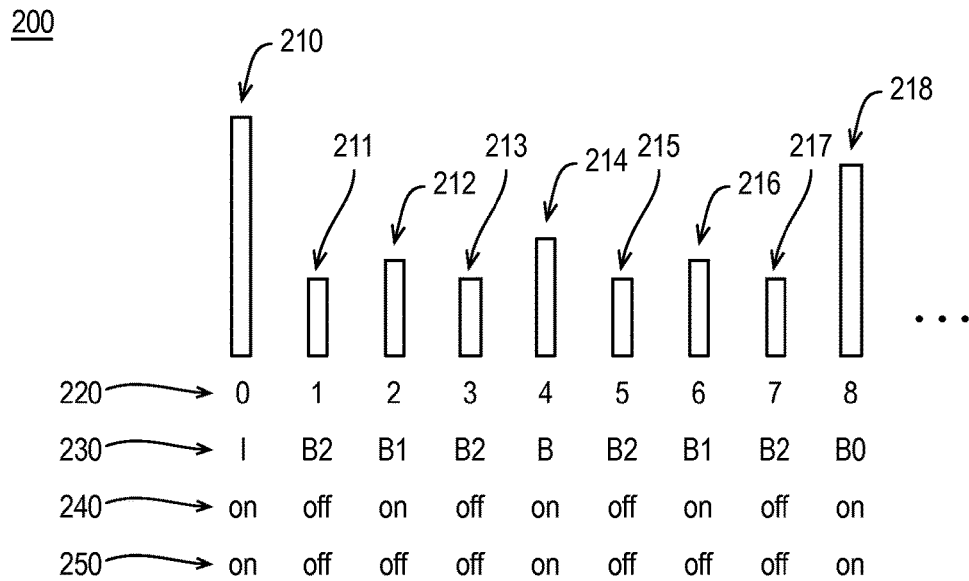
FIG. 2 illustrates an example group of pictures with hierarchical B-pictures.

FIG. 2 illustrates an example group of pictures 200 with hierarchical B-pictures, arranged in accordance with at least some implementations of the present disclosure. As shown in FIG. 2, group of pictures 200 may include pictures 210-218. In the illustrated example, group of pictures 200 may be a group of 8 pictures (e.g., GOP=8; not counting I-picture 210) in a display order 220 indicating that display order 220 (e.g., 0-8) follows in the order of picture 210, picture 211, picture 212, picture 213, picture 214, picture 215, picture 216, picture 217, and picture 218. Furthermore, group of pictures 200 may have picture types 230 such that picture 210 is an I-picture, picture 211 is a B2-picture, picture 212 is a B1-picture, picture 213 is a B2-picture, picture 214 is a B-picture, picture 215 is a B2-picture, picture 216 is a B1-picture, picture 217 is a B2-picture, and picture 218 is a B0-picture. For example, group of pictures 200 may be a group of pictures in an encoding context where hierarchical B-pictures are provided. In some examples, group of pictures 200 may be a group of pictures in a HEVC coding context. Although illustrated with particular details for the sake of clarity of presentation, group of pictures 200 may include any number of pictures of any suitable picture types in an suitable order.

As discussed, group of pictures 200 may have a display order 220 such that upon decode, pictures 210-218 may be decoded and displayed in display order 220. Furthermore, group of pictures 200 may have an encode order that may or may not match display order 220. In the example of FIG. 2, the hierarchy of group of pictures 200 may be I-, B0-, B-, B1-, B2- such that group of pictures 200 are encoded in order based on the hierarchy. For example, group of pictures 200 may have an encode order of: picture 210, picture 218, picture 214, picture 212, picture 211, picture 213, picture 216, picture 215 and picture 217 (e.g., 0, 8, 4, 2, 1, 3, 6, 5, 7).

As discussed with respect to FIG. 1, in some examples, coding structure adaptive SAO determination module 104 may determine the picture type of the current picture and, if the current picture is a non-reference B-picture (e.g., a B-picture not being used to code any other pictures of a group of pictures), coding structure adaptive SAO determination module 104 may set the current picture as an SAO skip picture. Furthermore, in such examples, all other hierarchical B-structure picture types (e.g., I-pictures, B0-pictures, B-pictures, and B1 pictures) may be set as SAO non-skip pictures.

As shown in FIG. 2, the implementation of such techniques may provide for SAO coding decisions 240. For example, picture 210 may be set as an SAO non-skip picture (e.g., SAO coding is on since picture 210 is not a B2-picture), picture 211 may be set as an SAO skip picture (e.g., SAO coding is off since picture 211 is a B2-picture), picture 212 may be set as an SAO non-skip picture (e.g., SAO coding is on since picture 212 is not a B2-picture), picture 213 may be set as an SAO skip picture (e.g., SAO coding is off since picture 213 is a B2-picture), picture 214 may be set as an SAO non-skip picture (e.g., SAO coding is on since picture 214 is not a B2-picture), picture 215 may be set as an SAO skip picture (e.g., SAO coding is off since picture 215 is a B2-picture), picture 216 may be set as an SAO non-skip picture (e.g., SAO coding is on since picture 216 is not a B2-picture), picture 217 may be set as an SAO skip picture (e.g., SAO coding is off since picture 217 is a B2-picture), and picture 218 may be set as an SAO non-skip picture (e.g., SAO coding is on since picture 218 is not a B2-picture).

Also as discussed with respect to FIG. 1, in other examples, coding structure adaptive SAO determination module 104 may determine the picture type of the current picture and, if the current picture is a low level B-picture (e.g., a B1-picture or a B2-picture), coding structure adaptive SAO determination module 104 may set the current picture as an SAO skip picture. Furthermore, in such examples, all other hierarchical B-structure picture types (e.g., I-pictures, B0-pictures, and B-pictures) may be set as SAO non-skip pictures.

As shown in FIG. 2, the implementation of such techniques may provide for SAO coding decisions 250. For example, picture 210 may be set as an SAO non-skip picture (e.g., SAO coding is on since picture 210 is not a B1- or B2-picture), picture 211 may be set as an SAO skip picture (e.g., SAO coding is off since picture 211 is a B2-picture), picture 212 may be set as an SAO skip picture (e.g., SAO coding is off since picture 212 is a B1-picture), picture 213 may be set as an SAO skip picture (e.g., SAO coding is off since picture 213 is a B2-picture), picture 214 may be set as an SAO non-skip picture (e.g., SAO coding is on since picture 214 is not a B1- or B2-picture), picture 215 may be set as an SAO skip picture (e.g., SAO coding is off since picture 215 is a B2-picture), picture 216 may be set as an SAO skip picture (e.g., SAO coding is off since picture 216 is a B1-picture), picture 217 may be set as an SAO skip picture (e.g., SAO coding is off since picture 217 is a B2-picture), and picture 218 may be set as an SAO non-skip picture (e.g., SAO coding is on since picture 218 is not a B1- or B2-picture).

Returning to FIG. 1, as discussed, coding structure adaptive SAO determination module 104 may determine whether a current picture is an SAO skip picture or an SAO non-skip picture using any suitable technique or techniques. In some examples, system 100 may implement video coding with a low delay coding structure. For example, such a low delay coding structure may restrict a display order and an encode order of a group of pictures to being the same and/or provide other coding restrictions. In such examples, coding structure adaptive SAO determination module 104 may determine whether a current picture is an SAO skip or non-skip picture by applying SAO skip and non-skip at a fixed picture interval. The fixed picture interval may provide SAO skip pictures at any suitable frequency such every other picture, every third picture, or the like or even more frequently with SAO non-skip pictures occurring every third or fourth picture or the like.

Figure 3:
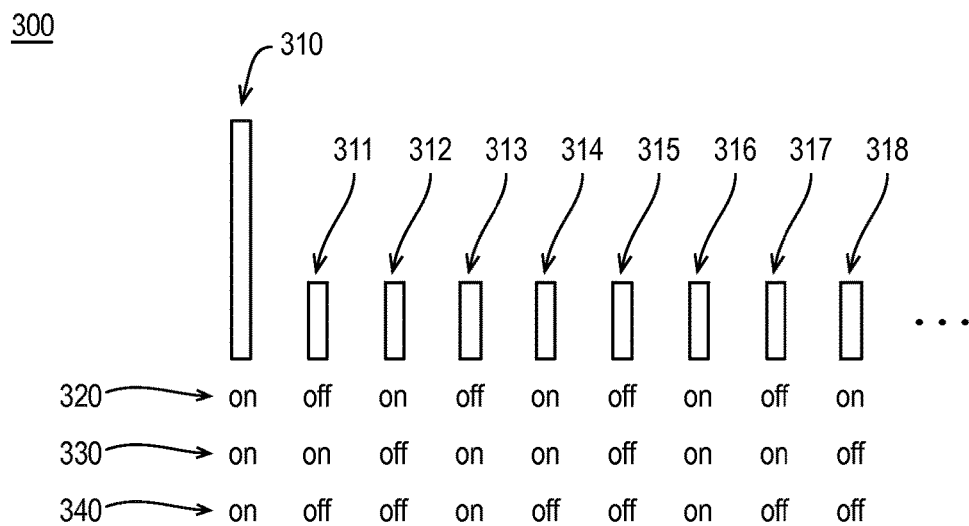
FIG. 3 illustrates an example group of pictures with a low delay coding structure.

FIG. 3 illustrates an example group of pictures 300 with a low delay coding structure, arranged in accordance with at least some implementations of the present disclosure. As shown in FIG. 3, group of pictures 300 may include pictures 310-318. In the illustrated example, group of pictures 300 may be a group of pictures in a display order and an encode order in the same order as pictures 310-318. Furthermore, group of pictures 300 may have two or more picture types such that picture 310 may be a high level picture or I-picture or reference picture or the like and pictures 311-318 may be low level pictures or non-reference pictures or the like. For example, group of pictures 300 may be a group of pictures in an encoding context with a low delay coding structure. Although illustrated with particular details for the sake of clarity of presentation, group of pictures 300 may include any number of pictures of any suitable picture types in an suitable order.

As discussed with respect to FIG. 1, in some examples, coding structure adaptive SAO determination module 104 may determine whether a current picture is an SAO skip picture or an SAO non-skip picture in low delay coding structure contexts by applying SAO skip and non-skip at a fixed picture interval. As shown in FIG. 3, the implementation of such techniques at a fixed interval of every other picture may provide for SAO coding decisions 320.

For example, picture 310 may be set as an SAO non-skip picture (e.g., SAO coding is on since picture 310 is a high level picture). Furthermore, picture 310, as a high level picture may mark or provide a starting point for implementing SAO skip and non-skip at a fixed picture intervals. Furthermore, pictures 311, 313, 315, and 317 may be set as SAO skip pictures (e.g., SAO coding may be set to off in an every other picture manner based on an every other picture fixed picture interval) and pictures 312, 314, 316, 318 may be set as SAO non-skip pictures based on the every other picture fixed picture interval.

Also as discussed, the fixed picture interval may provide SAO skip pictures at any suitable frequency such every other picture (e.g., as shown with respect to SAO coding decisions 320), every third picture, or the like or even more frequently with SAO non-skip pictures occurring every third or fourth picture or the like. For example, SAO coding decisions 330 illustrate an example where every third picture is an SAO skip picture (e.g., such that pictures 312, 315, and 318 are SAO skip pictures and pictures 310, 311, 313, 314, 316, and 317 are SAO non-skip pictures). Furthermore, SAO coding decisions 340 illustrate an example where every third picture is an SAO non-skip picture (e.g., such that 2 of every 3 are SAO skip pictures) such that pictures 311, 312, 314, 315, 317, and 318 are SAO skip pictures and pictures 310, 313, and 316 are SAO non-skip pictures.

Returning to FIG. 1, as discussed, coding structure adaptive SAO determination module 104 may determine whether a current picture is an SAO skip picture or an SAO non-skip picture using any suitable technique or techniques. In some examples, system 100 may implement video coding with an adaptive quantization parameter low delay coding structure. For example, such an adaptive quantization parameter low delay coding structure may restrict a display order and an encode order of a group of pictures to being the same but may provide for adaptive quantization parameters (e.g., lower QP for pictures for which higher quality is desired and higher QP for pictures for which lower quality is allowable). For example, such an adaptive quantization parameter low delay coding structure may allow for rate control module 101 and/or other modules of system 100 to provide different quantization parameters for different pictures of a group of pictures.

Figure 4:
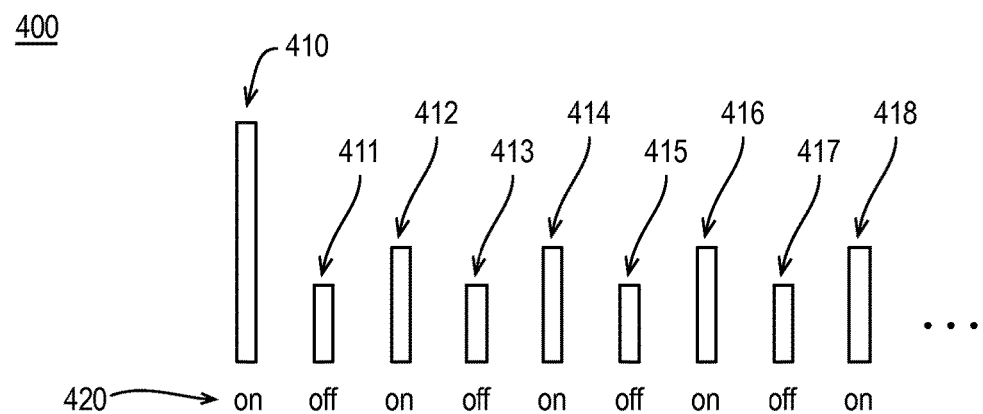
FIG. 4 illustrates an example group of pictures with an adaptive quantization parameter low delay coding structure.

In such examples, coding structure adaptive SAO determination module 104 may determine whether a current picture is an SAO skip or non-skip picture based on the quantization parameter provided for a picture. For example, if a high quantization parameter is provided for a picture (e.g., via rate control module 101 and/or other modules of system 100), coding structure adaptive SAO determination module 104 may set the picture as an SAO skip picture. If a low quantization parameter is provided for a picture (e.g., via rate control module 101 and/or other modules of system 100), coding structure adaptive SAO determination module 104 may set the picture as an SAO non-skip picture FIG. 4 illustrates an example group of pictures 400 with an adaptive quantization parameter low delay coding structure, arranged in accordance with at least some implementations of the present disclosure. As shown in FIG. 4, group of pictures 400 may include pictures 410-418. In the illustrated example, group of pictures 400 may be a group of pictures in a display order and an encode order in the same order as pictures 410-418. Furthermore, group of pictures 400 may have two or more picture types such that picture 410 may be a high level picture or I-picture or reference picture or the like and pictures 411-418 may be low level pictures or non-reference pictures or the like. Furthermore, among pictures 411-418, some pictures may be low quantization parameter pictures and other pictures may be high quantization parameter pictures. For example, pictures 411, 413, 415, and 417 may be high quantization parameter pictures (e.g., lower quality pictures) and pictures 412, 414, 416, and 418 may be low quantization parameter pictures (e.g., higher quality pictures). Although illustrated with particular details for the sake of clarity of presentation, group of pictures 400 may include any number of pictures of any suitable picture types in an suitable order. In particular, in some examples, high and low quantization parameter pictures may not be alternate.

As discussed with respect to FIG. 1, in some examples, coding structure adaptive SAO determination module 104 may determine whether a current picture is an SAO skip picture or an SAO non-skip picture in adaptive quantization parameter low delay coding structure contexts by setting the picture as an SAO skip picture when the quantization parameter associated with the picture is a high level (e.g., a high) quantization parameter and setting the picture as an SAO non-skip picture when the quantization parameter associated with the picture is a low level (e.g., a low) quantization parameter. In such a manner, SAO skip pictures and SAO non-skip pictures may track with the quantization parameter assigned to the picture such that high quality pictures are SAO non-skip pictures and low quality pictures are SAO skip pictures. For example, coding structure adaptive SAO determination module 104 may determine SAO skip and non-skip pictures as shown with respect to SAO coding decisions 420 such that pictures 411, 413, 415, and 417 may be SAO skip pictures (e.g., with SAO coding off) and pictures 410, 412, 414, 416, and 418 may be SAO non-skip pictures (e.g., with SAO coding on).

Returning to FIG. 1, as discussed, SAO setting modules 108-111 may provide signal 126 including skip indicators for pictures of video 121 to SAO processing module 112. If the skip indicator for a picture indicates the picture is an SAO skip picture, SAO processing module 112 may skip SAO processing for the picture and SAO processing module 112 may provide the associated skip indicator via SAO flags and parameters signal 124 to entropy encoder 113, which may entropy encode the skip indicator for inclusion in bitstream 125. For example, such skip indicator or SAO flags or the like (e.g., indicating pictures are skip or non-skip SAO pictures) may be included in a header of bitstream 125 such as a slice header or the like.

If the skip indicator for a picture indicates the picture is an SAO non-skip picture, SAO processing module 112 may process the picture using any suitable technique or techniques. In some examples, the SAO non-skip picture may be compared to its reference picture (e.g., a picture with reference to which the SAO non-skip picture is being coded) and, if the SAO non-skip picture matches its reference picture, the SAO non-skip picture may be changed to an SAO skip picture (e.g., the skip indicator may be changed from on to off). The determination as to whether the picture and the reference picture match may be made using any suitable technique or techniques. In some examples, the determination may be based on all coding units of the picture being motion estimation skip blocks or units. For example, after performing motion estimation coding, if all coding units of the picture are skip blocks or units (e.g., each block has a zero motion vector), the picture and the reference picture may be determined to be matches.

If the SAO non-skip picture is changed to an SAO skip picture based on the picture and the reference picture matching, such an flag or indicator may be provided to entropy encoder 113 via SAO flags and parameters signal 124 for inclusion in bitstream 125 as discussed.

If the current picture is not changed to an SAO skip picture, the SAO non-skip picture flag or indicator may be provided to entropy encoder 113 via SAO flags and parameters signal 124 for inclusion in bitstream 125. For example, the SAO non-skip picture flag or indicator may be included in a slice header of bitstream 125 or the like.

Furthermore, SAO processing module 112 may continue with coding unit level SAO processing decisions for the SAO non-skip picture. For example, once SAO is decided on the picture (e.g., as SAO on), adaptive coding unit level SAO decisions may be applied to further simplify SAO parameter estimation and SAO parameter encoding. As used herein, the term coding unit includes any suitable portion of a picture such as a largest coding unit, a partition of a largest coding unit, a macroblock, a prediction block, or the like in any suitable coding context.

In some examples, for an SAO non-skip picture, SAO processing module 112 may determine whether a coding unit of the current SAO non-skip picture is in a static region (e.g., the coding unit of the current SAO non-skip picture has a zero motion vector) or a prediction residue (e.g., a motion prediction residue) between the coding unit of the current SAO non-skip picture and its reference coding unit (e.g., the coding unit from a reference picture being used to code the coding unit) is less than a threshold. If so, a coding unit sample adaptive offset coding flag may be set to skip for the coding unit (e.g., SAO coding may be skipped for such a coding unit). If not, a coding unit sample adaptive offset flag may be set to non-skip for the coding unit and SAO parameters may be determined for the condign unit using any suitable technique or techniques. Such processing may be repeated for any or all coding units of the SAO non-skip picture and the resultant coding unit sample adaptive offset flags (e.g., skip or non-skip) and SAO parameters may be provided to entropy encoder 113 via SAO flags and parameters signal 124 for entropy encoding and inclusion in bitstream 125.

In other examples, for an SAO non-skip picture, SAO processing module 112 may determine whether a coding unit of the current SAO non-skip picture has a zero motion vector (e.g., a motion vector for the coding unit is a zero motion vector) and a quantization parameter associated with its reference coding unit (e.g., the coding unit from a reference picture being used to code the coding unit) is less than a threshold. If so, a coding unit sample adaptive offset flag may be set to non-skip for the coding unit. Furthermore, the SAO parameters for the coding unit of the current SAO non-skip picture may be copied from the reference coding unit (instead of being determined). For example, sample adaptive offset parameters previously determined for the reference coding unit may be copied for the current coding unit and provided via SAO flags and parameters 124 for entropy encoding via entropy encoder 113 and inclusion in bitstream 125. Such copying of sample adaptive offset parameters may provide computational savings for example.

The determination as to whether the coding unit of the current SAO non-skip picture is the same as its reference coding unit may be made using any suitable technique or techniques. In some examples, the coding unit of the current SAO non-skip picture may be determined to be the same as its reference coding unit if the residue (e.g., difference) between the coding unit of the current SAO non-skip picture and the reference coding unit is less than a threshold.

The techniques discussed herein may provide effective and efficient compression of video data. Such techniques may provide computational efficiency and may be advantageously implemented via hardware. Furthermore, such techniques may provide SAO picture level and/or coding unit level skip decisions that reduce SAO processing and achieve similar subjective quality with respect to full SAO coding.

Figure 5:
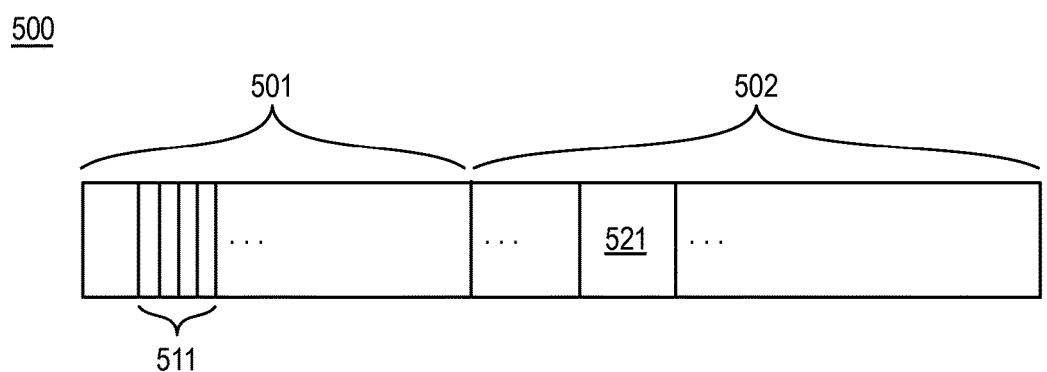
FIG. 5 illustrates an example bitstream.

FIG. 5 illustrates an example bitstream 500, arranged in accordance with at least some implementations of the present disclosure. In some examples, bitstream 500 may correspond to bitstream 125 as shown in FIG. 1. As shown in FIG. 5, in some examples, bitstream 500 may include a header portion 501 and a data portion 502. Header portion 501 may include indicators such as picture level SAO skip indicators 511 and the like. For example, picture level SAO skip indicators 511 may include indicators or flags or bits or the like indicating whether or not SAO coding (e.g., decoding with SAO processing) is to be to performed for particular pictures of video. For example, picture level SAO skip indicators 511 may include SAO flags (e.g., representing skip or non-skip indicators) for particular pictures of video.

Furthermore, data portion 502 may include SAO parameter data 521 for SAO non-skip pictures indicated as SAO coded via picture level SAO skip indicators 511. For example, SAO parameter data 521 may include SAO parameters of SAO flags and parameters 124 or the like. Such SAO parameter data 521 may include, for example, parameters for providing offsets for reconstructing pictures or the like.

Figure 6:
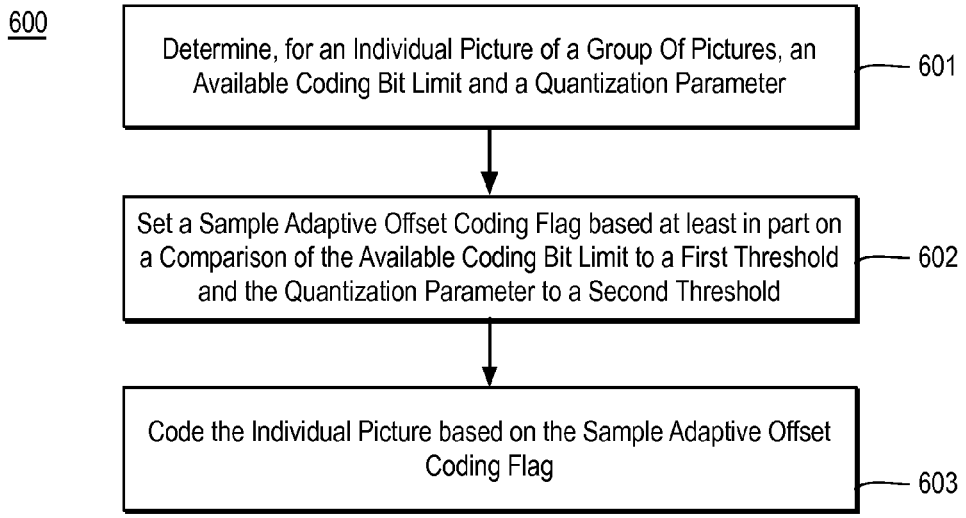
FIG. 6 is a flow diagram illustrating an example process for video coding with sample adaptive offset skip coding.

FIG. 6 is a flow diagram illustrating an example process 600 for video coding with sample adaptive offset skip coding, arranged in accordance with at least some implementations of the present disclosure. Process 600 may include one or more operations 601-603 as illustrated in FIG. 6. Process 600 may form at least part of a video coding process. By way of non-limiting example, process 600 may form at least part of a video coding process as performed by any device or system as discussed herein such as system 100. Furthermore, process 600 will be described herein with reference to system 700 of FIG. 7.

Figure 7:
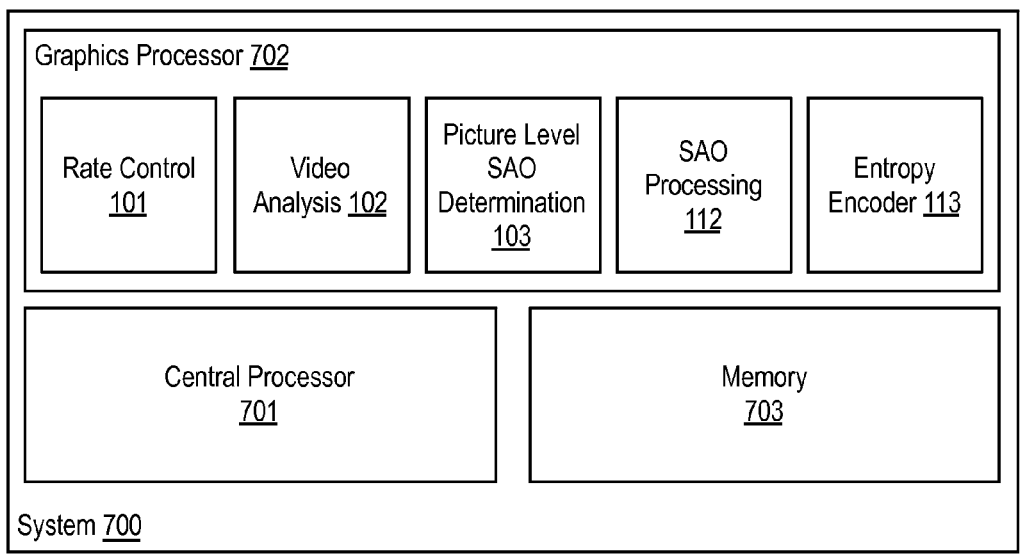
FIG. 7 is an illustrative diagram of an example system for video coding with sample adaptive offset skip coding.

FIG. 7 is an illustrative diagram of an example system 700 for video coding with sample adaptive offset skip coding, arranged in accordance with at least some implementations of the present disclosure. As shown in FIG. 7, system 700 may include central processor 701, a graphics processor 702, and memory 703. Also as shown, graphics processor 702 may include rate control module 101, video analysis module 102, picture level SAO determination module 103, SAO processing module 112, and entropy encoder 113. In the example of system 700, memory 703 may store video data or related content such as video, video data, picture data, frame data, group or picture data, picture type data, available coding bit limits, quantization parameters, picture level SAO skip data, coding unit level SAO skip data, skip indicators, skip or non-skip signal data, SAO parameter data, bitstream data, control data, and/or any other data as discussed herein.

As shown, in some examples, rate control module 101, video analysis module 102, picture level SAO determination module 103, SAO processing module 112, and entropy encoder 113 may be implemented via graphics processor 702. In other examples, one or more or portions rate control module 101, video analysis module 102, picture level SAO determination module 103, SAO processing module 112, and entropy encoder 113 may be implemented via central processor 701, or another processing unit such as an image processor, an image processing pipeline, or the like.

Graphics processor 702 may include any number and type of graphics processing units that may provide the operations as discussed herein. Such operations may be implemented via software or hardware or a combination thereof. For example, graphics processor 702 may include circuitry dedicated to manipulate pictures, picture data, or the like obtained from memory 703. Central processor 701 may include any number and type of processing units or modules that may provide control and other high level functions for system 700 and/or provide any operations as discussed herein. Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

In an embodiment, one or more or portions of rate control module 101, video analysis module 102, picture level SAO determination module 103, SAO processing module 112, and entropy encoder 113 may be implemented via an execution unit (EU) of graphics processor 702. The EU may include, for example, programmable logic or circuitry such as a logic core or cores that may provide a wide array of programmable logic functions. In an embodiment, one or more or portions of rate control module 101, video analysis module 102, picture level SAO determination module 103, SAO processing module 112, and entropy encoder 113 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 may begin at operation 601, "Determine, for an Individual Picture of a Group Of Pictures, an Available Coding Bit Limit and a Quantization Parameter", where, for an individual picture of a group of pictures, an available coding bit limit and a quantization parameter may be determined. The available coding bit limit and the quantization parameter may be determined using any suitable technique or techniques. For example, rate control module 101 as implemented via graphics processor 702 may determine the available coding bit limit and the quantization parameter.

Processing may continue at operation 602, "Set a Sample Adaptive Offset Coding Flag based at least in part on a Comparison of the Available Coding Bit Limit to a First Threshold and the Quantization Parameter to a Second Threshold", where a sample adaptive offset coding flag for the individual picture may be set based at least in part on a comparison of the available coding bit limit to a first threshold and the quantization parameter to a second threshold. For example, picture level SAO determination module 103 as implemented via graphics processor 702 may set the sample adaptive offset coding flag for the individual picture based on the the available coding bit limit and the quantization parameter and/or parameters generated by video analysis module 102 as implemented via graphics processor 702.

In some examples, the sample adaptive offset coding flag for the individual picture may be set to off when the available coding bit limit is not greater than the first threshold and the quantization parameter is not less than the second threshold as discussed herein with respect to comparator module 105. Furthermore, in some examples, the first threshold may be an adaptive threshold based on a resolution of the individual picture.

In some examples, when the available coding bit limit is not less than the first threshold or the quantization parameter is not greater than the second threshold, further processing may be applied to determine the sample adaptive offset coding flag for the individual picture. For example, the individual picture may be determined to be a scene change picture and the sample adaptive offset coding flag may be set to on based on the determination the individual picture is a scene change picture.

In some examples, when the available coding bit limit is not less than the first threshold or the quantization parameter is not greater than the second threshold, the sample adaptive offset coding flag for the individual picture may be set based at least in part on a coding structure associated with coding the group of pictures. In some examples, the coding structure may include a hierarchical B structure, the individual picture may be an I-picture, and setting the sample adaptive offset coding flag may include setting the sample adaptive offset coding flag to on (e.g., based on the individual picture being an I-picture). In some examples, the coding structure may be a hierarchical B structure, the individual picture may be a non-reference B-picture, and setting the sample adaptive offset coding flag may include setting the sample adaptive offset coding flag to off (e.g., based on the individual picture being a non-reference B-picture). In some examples, the coding structure may be a hierarchical B structure, the individual picture may be a B1-picture or a B2-picture, and setting the sample adaptive offset coding flag may include setting the sample adaptive offset coding flag to off (e.g., based on the individual picture being a B1-picture or a B2-picture). In some examples, the coding structure may be a low delay coding structure and setting the sample adaptive offset coding flag for the individual picture may include setting sample adaptive offset coding flags to the group of pictures at a fixed picture interval. For example, the fixed picture interval may be every other picture or the like. In some examples, the coding structure may be an adaptive quantization parameter low delay coding structure and setting the sample adaptive offset coding flag for the individual picture may include setting the flag to off when a high quantization parameter is associated with the individual picture and setting the flag to on when a low quantization parameter is associated with the individual picture.

In some examples, the sample adaptive offset coding flag for the individual picture may be set to on and further processing may be performed to potentially change the flag to off or to provide coding unit level sample adaptive offset coding flags for the individual picture. For example, such processing may be performed by SAO processing module 112 as implemented via graphics processor 702. In some examples, the sample adaptive offset coding flag may be on and process 600 may further include determining the individual picture matches a reference picture associated with the individual picture and setting the sample adaptive offset coding flag to off based on the determination the individual picture matches the reference picture. In some examples, the sample adaptive offset coding flag may be on and process 600 may further include determining, for a coding unit of the individual picture, a motion vector associated with the coding unit is a zero vector or a prediction residue associated with the coding unit is not greater than a threshold and setting a coding unit sample adaptive offset flag as skip for the coding unit (e.g., based on the motion vector being a zero vector or the prediction residue being not greater than the threshold). In some examples, the sample adaptive offset coding flag may be on and process 600 may further include determining, for a coding unit of the individual picture, a motion vector associated with the coding unit is a zero vector and a quantization parameter of a reference coding unit associated with the coding unit is not less than a threshold and copying sample adaptive offset parameters of the reference coding unit for the coding unit of the individual picture (e.g., based on the motion vector being a zero vector and the quantization parameter of the reference coding unit being not less than the threshold).

Processing may continue at operation 603, "Code the Individual Picture based on the Sample Adaptive Offset Coding Flag", where the individual picture may be coded based at least in part on the sample adaptive offset coding flag. For example, the individual picture may be coded by entropy encoder 113 as implemented via graphics processor 702. For example, the coding may include skipping SAO coding for pictures with SAO coding flags that are off and performing SAO coding for pictures with SAO coding flags that are on. In some examples, such coding may also be based on coding unit sample adaptive offset flags (e.g., such that SAO coding is skipped for coding units with SAO flags set to off and SAO coding is performed for coding units with SAO flags set to on). Furthermore, in some examples, such encoding may include copying SAO parameters from reference coding units (e.g., of a reference picture being used to code the current picture) for some coding units.

Process 600 may be repeated any number of times either in series or in parallel for any number pictures or groups of pictures or the like. As discussed, process 600 may provide for video encoding with sample adaptive offset skip coding. For example, the discussed techniques for video coding may provide computationally efficient, low power video coding with relatively high quality and low levels of artifacts.

Various components of the systems described herein may be implemented in software, firmware, and/or hardware and/or any combination thereof. For example, various components of system 100, system 700, system 800, or device 900 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of process 600 or any operations discussed herein and/or any portions of system 100, system 800, device 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
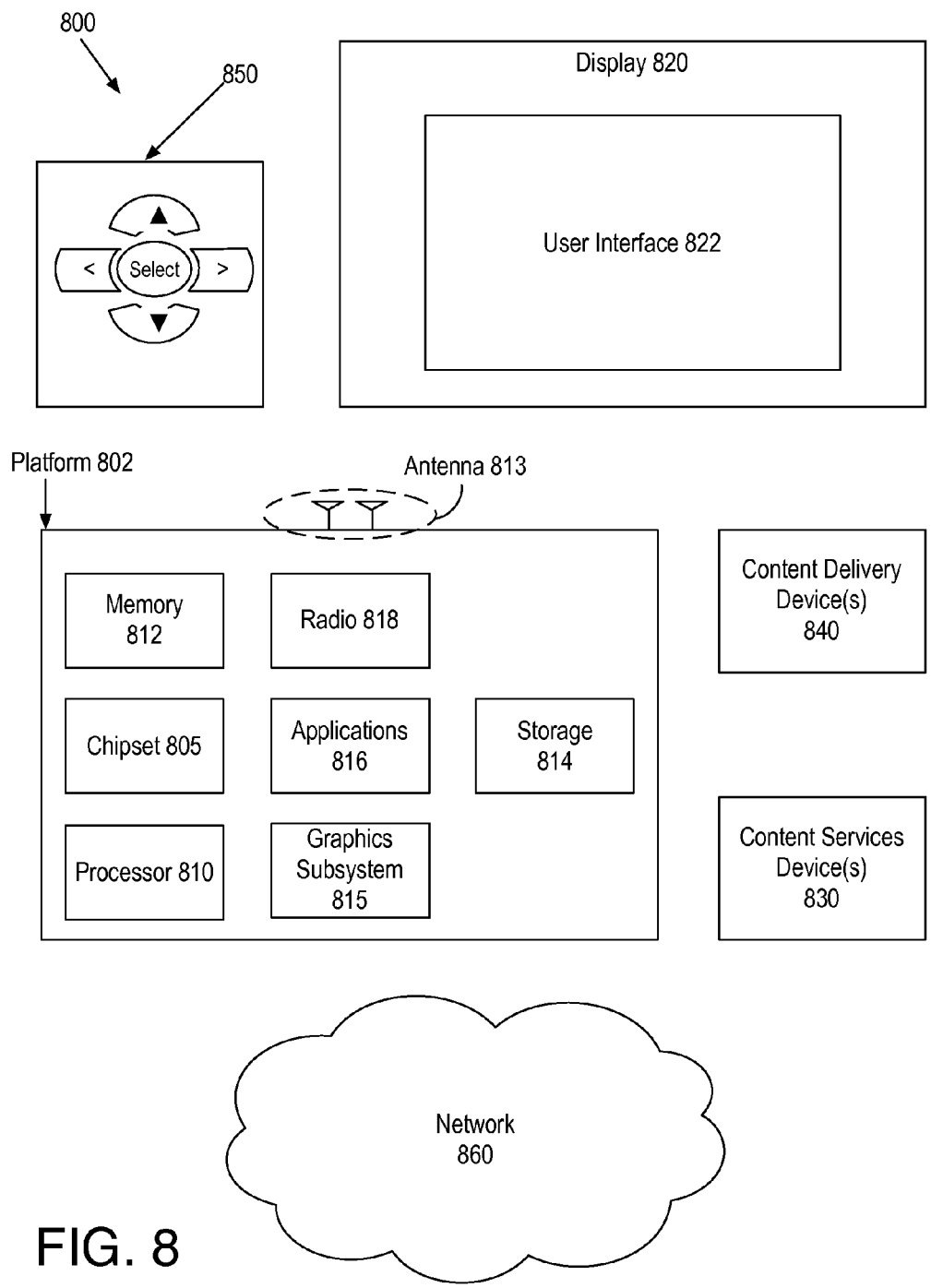
FIG. 8 is an illustrative diagram of an example system.

FIG. 8 is an illustrative diagram of an example system 800, arranged in accordance with at least some implementations of the present disclosure. In various implementations, system 800 may be a mobile system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via a network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of may be used to interact with user interface 822, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 820) by movements of a pointer, cursor, focus ring, or other visual indicators displayed on the display. For example, under the control of software applications 816, the navigation features located on navigation may be mapped to virtual navigation features displayed on user interface 822, for example. In various embodiments, may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
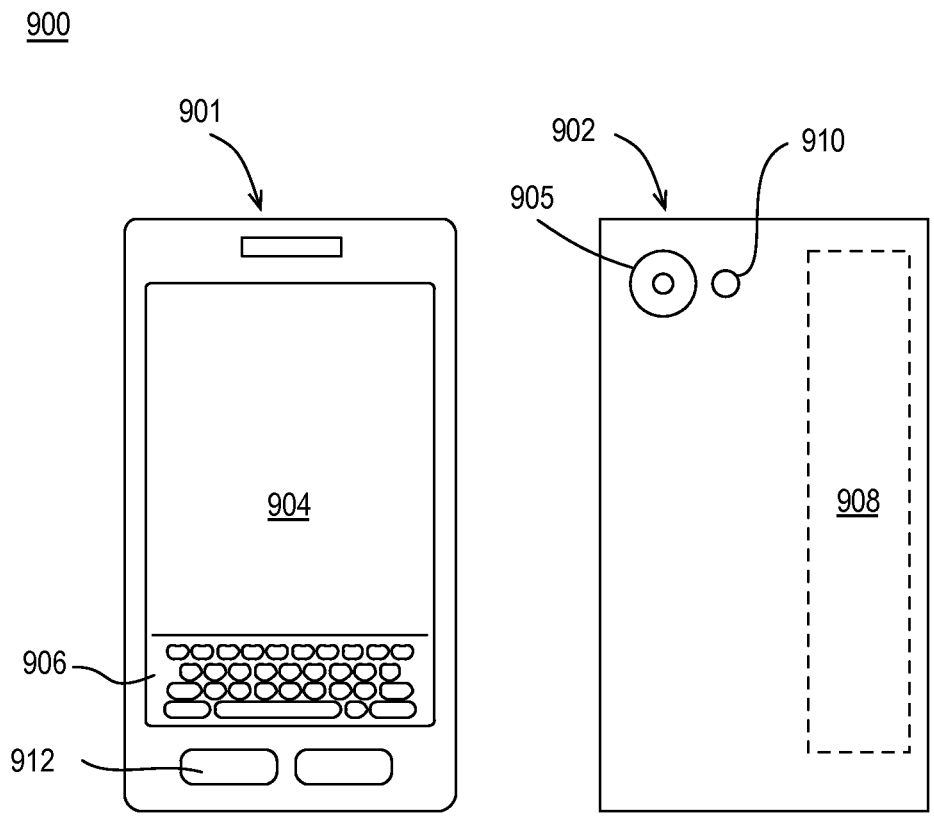
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 1000 may be implemented via device 900. In other examples, system 100 or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises determining, for an individual picture of a group of pictures, an available coding bit limit and a quantization parameter, setting a sample adaptive offset coding flag for the individual picture based at least in part on a comparison of the available coding bit limit to a first threshold and the quantization parameter to a second threshold, and coding the individual picture based at least in part on the sample adaptive offset coding flag.

Further to the first embodiments, the sample adaptive offset coding flag for the individual picture is set to off when the available coding bit limit is not greater than the first threshold and the quantization parameter is not less than the second threshold.

Further to the first embodiments, the sample adaptive offset coding flag for the individual picture is set to off when the available coding bit limit is not greater than the first threshold and the quantization parameter is not less than the second threshold, wherein the first threshold comprises an adaptive threshold based on a resolution of the individual picture.

Further to the first embodiments, the available coding bit limit is not less than the first threshold or the quantization parameter is not greater than the second threshold and the method further comprises determining the individual picture is a scene change picture and setting the sample adaptive offset coding flag to on based on the determination the individual picture is a scene change picture.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the individual picture comprises an I-picture, and setting the sample adaptive offset coding flag comprises setting the sample adaptive offset coding flag to on.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the coding structure comprises a hierarchical B structure, the individual picture comprises a non-reference B-picture, and setting the sample adaptive offset coding flag comprises setting the sample adaptive offset coding flag to off.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the coding structure comprises a hierarchical B structure, the individual picture comprises at least one of a B1-picture or a B2-picture, and setting the sample adaptive offset coding flag comprises setting the sample adaptive offset coding flag to off.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the coding structure comprises a low delay coding structure and setting the sample adaptive offset coding flag for the individual picture comprises setting sample adaptive offset coding flags to the group of pictures at a fixed picture interval.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the coding structure comprises an adaptive quantization parameter low delay coding structure and setting the sample adaptive offset coding flag for the individual picture comprises setting the flag to off when a high quantization parameter is associated with the individual picture and setting the flag to on when a low quantization parameter is associated with the individual picture.

Further to the first embodiments, the available coding bit limit is not less than the first threshold or the quantization parameter is not greater than the second threshold and the method further comprises setting the sample adaptive offset coding flag for the individual picture based at least in part on a coding structure associated with coding the group of pictures, wherein the coding structure comprises a hierarchical B structure, the individual picture comprises a non-reference B-picture, and setting the sample adaptive offset coding flag comprises setting the sample adaptive offset coding flag to off, or wherein the coding structure comprises a low delay coding structure and setting the sample adaptive offset coding flag for the individual picture comprises setting sample adaptive offset coding flags to the group of pictures at a fixed picture interval, or wherein the coding structure comprises an adaptive quantization parameter low delay coding structure and setting the sample adaptive offset coding flag for the individual picture comprises setting the flag to off when a high quantization parameter is associated with the individual picture and setting the flag to on when a low quantization parameter is associated with the individual picture.

Further to the first embodiments, the sample adaptive offset coding flag is on and the method further comprises determining the individual picture matches a reference picture associated with the individual picture and setting the sample adaptive offset coding flag to off based on the determination the individual picture matches the reference picture.

Further to the first embodiments, the sample adaptive offset coding flag is on and the method further comprises determining, for a coding unit of the individual picture, at least one of a motion vector associated with the coding unit is a zero vector or a prediction residue associated with the coding unit is not greater than a third threshold and setting a coding unit sample adaptive offset flag to off for the coding unit.

Further to the first embodiments, wherein the sample adaptive offset coding flag is on and the method further comprises determining, for a coding unit of the individual picture, a motion vector associated with the coding unit is a zero vector and a second quantization parameter of a reference coding unit associated with the coding unit is not less than a third threshold and copying sample adaptive offset parameters of the reference coding unit for the coding unit of the individual picture.

In one or more second embodiments, a system for video encoding comprises a memory to store a group of pictures and a graphics processor coupled to the memory, the graphics processor to determine, for an individual picture of the group of pictures, an available coding bit limit and a quantization parameter, set a sample adaptive offset coding flag for the individual picture based at least in part on a comparison of the available coding bit limit to a first threshold and the quantization parameter to a second threshold, and code the individual picture based at least in part on the sample adaptive offset coding flag.

Further to the second embodiments, the graphics processor is to set the sample adaptive offset coding flag for the individual picture to off when the available coding bit limit is not greater than the first threshold and the quantization parameter is not less than the second threshold.

Further to the second embodiments, the graphics processor is to set the sample adaptive offset coding flag for the individual picture to off when the available coding bit limit is not greater than the first threshold and the quantization parameter is not less than the second threshold, wherein the first threshold comprises an adaptive threshold based on a resolution of the individual picture.

Further to the second embodiments, the available coding bit limit is not less than the first threshold or the quantization parameter is not greater than the second threshold and the graphics processor is further to determine the individual picture is a scene change picture and seat the sample adaptive offset coding flag to on based on the determination the individual picture is a scene change picture.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the individual picture comprises an I-picture and the graphics processor to set the sample adaptive offset coding flag comprises the graphics processor to set the sample adaptive offset coding flag to on.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the coding structure comprises a hierarchical B structure, the individual picture comprises a non-reference B-picture, and the graphics processor to set the sample adaptive offset coding flag comprises the graphics processor to set the sample adaptive offset coding flag to off.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the coding structure comprises a hierarchical B structure, the individual picture comprises at least one of a B1-picture or a B2-picture, and the graphics processor to set the sample adaptive offset coding flag comprises the graphics processor to set the sample adaptive offset coding flag to off.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the coding structure comprises a low delay coding structure and the graphics processor to set the sample adaptive offset coding flag for the individual picture comprises the graphics processor to set sample adaptive offset coding flags to the group of pictures at a fixed picture interval.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the coding structure comprises an adaptive quantization parameter low delay coding structure and the graphics processor to set the sample adaptive offset coding flag for the individual picture comprises the graphics processor to set the flag to off when a high quantization parameter is associated with the individual picture and set the flag to on when a low quantization parameter is associated with the individual picture.

Further to the second embodiments, the available coding bit limit is not less than the first threshold or the quantization parameter is not greater than the second threshold and the graphics processor is further to set the sample adaptive offset coding flag for the individual picture based at least in part on a coding structure associated with coding the group of pictures, wherein the coding structure comprises a hierarchical B structure, the individual picture comprises a non-reference B-picture, and the graphics processor to set the sample adaptive offset coding flag comprises the graphics processor to set the sample adaptive offset coding flag to off, or wherein the coding structure comprises a low delay coding structure and the graphics processor to set the sample adaptive offset coding flag for the individual picture comprises the graphics processor to set sample adaptive offset coding flags to the group of pictures at a fixed picture interval, or wherein the coding structure comprises an adaptive quantization parameter low delay coding structure and the graphics processor to set the sample adaptive offset coding flag for the individual picture comprises the graphics processor to set the flag to off when a high quantization parameter is associated with the individual picture and set the flag to on when a low quantization parameter is associated with the individual picture.

Further to the second embodiments, the sample adaptive offset coding flag is on and the graphics processor is further to determine the individual picture matches a reference picture associated with the individual picture and set the sample adaptive offset coding flag to off based on the determination the individual picture matches the reference picture Further to the second embodiments, the sample adaptive offset coding flag is on and the graphics processor is further to determine, for a coding unit of the individual picture, at least one of a motion vector associated with the coding unit is a zero vector or a prediction residue associated with the coding unit is not greater than a third threshold and set a coding unit sample adaptive offset flag to off for the coding unit.

Further to the second embodiments, the sample adaptive offset coding flag is on and the graphics processor is further to determine, for a coding unit of the individual picture, a motion vector associated with the coding unit is a zero vector and a second quantization parameter of a reference coding unit associated with the coding unit is not less than a third threshold and copy sample adaptive offset parameters of the reference coding unit for the coding unit of the individual picture.

In one or more third embodiments, a system for video encoding comprises means for determining, for an individual picture of a group of pictures, an available coding bit limit and a quantization parameter, means for setting a sample adaptive offset coding flag for the individual picture based at least in part on a comparison of the available coding bit limit to a first threshold and the quantization parameter to a second threshold, and means for coding the individual picture based at least in part on the sample adaptive offset coding flag.

Further to the third embodiments, the sample adaptive offset coding flag for the individual picture is set to off when the available coding bit limit is not greater than the first threshold and the quantization parameter is not less than the second threshold.

Further to the third embodiments, the sample adaptive offset coding flag for the individual picture is set to off when the available coding bit limit is not greater than the first threshold and the quantization parameter is not less than the second threshold, wherein the first threshold comprises an adaptive threshold based on a resolution of the individual picture.

Further to the third embodiments, the available coding bit limit is not less than the first threshold or the quantization parameter is not greater than the second threshold and the system further comprises means for determining the individual picture is a scene change picture and means for setting the sample adaptive offset coding flag to on based on the determination the individual picture is a scene change picture.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures, wherein the individual picture comprises an I-picture and the means for setting the sample adaptive offset coding flag comprise means for setting the sample adaptive offset coding flag to on.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures, wherein the coding structure comprises a hierarchical B structure, the individual picture comprises a non-reference B-picture, and the means for setting the sample adaptive offset coding flag comprise means for setting the sample adaptive offset coding flag to off.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures, wherein the coding structure comprises a hierarchical B structure, the individual picture comprises at least one of a B1-picture or a B2-picture, and the means for setting the sample adaptive offset coding flag comprise means for setting the sample adaptive offset coding flag to off.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures, wherein the coding structure comprises a low delay coding structure and the means for setting the sample adaptive offset coding flag for the individual picture comprise means for setting sample adaptive offset coding flags to the group of pictures at a fixed picture interval.

Further to the third embodiments, the available coding bit limit is not less than the first threshold or the quantization parameter is not greater than the second threshold and the system further comprises means for setting the sample adaptive offset coding flag for the individual picture based at least in part on a coding structure associated with coding the group of pictures, wherein the coding structure comprises an adaptive quantization parameter low delay coding structure and the means for setting the sample adaptive offset coding flag for the individual picture comprise means for setting the flag to off when a high quantization parameter is associated with the individual picture and means for setting the flag to on when a low quantization parameter is associated with the individual picture.

Further to the third embodiments, the sample adaptive offset coding flag is on and the system further comprises means for determining the individual picture matches a reference picture associated with the individual picture and means for setting the sample adaptive offset coding flag to off based on the determination the individual picture matches the reference picture.

Further to the third embodiments, the sample adaptive offset coding flag is on and the system further comprises means for determining, for a coding unit of the individual picture, at least one of a motion vector associated with the coding unit is a zero vector or a prediction residue associated with the coding unit is not greater than a third threshold and means for setting a coding unit sample adaptive offset flag to off for the coding unit.

Further to the third embodiments, the sample adaptive offset coding flag is on, the system further comprises means for determining, for a coding unit of the individual picture, a motion vector associated with the coding unit is a zero vector and a second quantization parameter of a reference coding unit associated with the coding unit is not less than a third threshold and means for copying sample adaptive offset parameters of the reference coding unit for the coding unit of the individual picture.

In one or more fourth embodiments, at least one machine readable medium comprises a plurality of instructions that, in response to being executed on a computing device, cause the computing device to perform video coding by determining, for an individual picture of a group of pictures, an available coding bit limit and a quantization parameter, setting a sample adaptive offset coding flag for the individual picture based at least in part on a comparison of the available coding bit limit to a first threshold and the quantization parameter to a second threshold, and coding the individual picture based at least in part on the sample adaptive offset coding flag.

Further to the fourth embodiments, the available coding bit limit is not less than the first threshold or the quantization parameter is not greater than the second threshold and the machine readable medium comprises further instructions that, in response to being executed on the computing device, cause the computing device to perform video coding by setting the sample adaptive offset coding flag for the individual picture based at least in part on a coding structure associated with coding the group of pictures.

Further to the fourth embodiments, the available coding bit limit is not less than the first threshold or the quantization parameter is not greater than the second threshold and the machine readable medium comprises further instructions that, in response to being executed on the computing device, cause the computing device to perform video coding by setting the sample adaptive offset coding flag for the individual picture based at least in part on a coding structure associated with coding the group of pictures, wherein the coding structure comprises a hierarchical B structure, the individual picture comprises a non-reference B-picture, and setting the sample adaptive offset coding flag comprises setting the sample adaptive offset coding flag to off.

Further to the fourth embodiments, the available coding bit limit is not less than the first threshold or the quantization parameter is not greater than the second threshold and the machine readable medium comprises further instructions that, in response to being executed on the computing device, cause the computing device to perform video coding by setting the sample adaptive offset coding flag for the individual picture based at least in part on a coding structure associated with coding the group of pictures, wherein the coding structure comprises a low delay coding structure and setting the sample adaptive offset coding flag for the individual picture comprises setting sample adaptive offset coding flags to the group of pictures at a fixed picture interval.

Further to the fourth embodiments, the available coding bit limit is not less than the first threshold or the quantization parameter is not greater than the second threshold and the machine readable medium comprises further instructions that, in response to being executed on the computing device, cause the computing device to perform video coding by setting the sample adaptive offset coding flag for the individual picture based at least in part on a coding structure associated with coding the group of pictures, wherein the coding structure comprises an adaptive quantization parameter low delay coding structure and setting the sample adaptive offset coding flag for the individual picture comprises setting the flag to off when a high quantization parameter is associated with the individual picture and setting the flag to on when a low quantization parameter is associated with the individual picture.

Further to the fourth embodiments, the sample adaptive offset coding flag is on and the machine readable medium comprises further instructions that, in response to being executed on the computing device, cause the computing device to perform video coding by determining, for a coding unit of the individual picture, a motion vector associated with the coding unit is a zero vector and a second quantization parameter of a reference coding unit associated with the coding unit is not less than a third threshold and copying sample adaptive offset parameters of the reference coding unit for the coding unit of the individual picture.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   determining, for an individual picture of a group of pictures, an available coding bit limit and a quantization parameter;
   setting a sample adaptive offset coding flag for the individual picture based at least in part on a comparison of the available coding bit limit to a first threshold and the quantization parameter to a second threshold, wherein, when the available coding bit limit is not less than the first threshold or the quantization parameter is not greater than the second threshold, setting the sample adaptive offset coding flag for the individual picture comprises setting the sample adaptive offset coding flag based at least in part on a coding structure associated with coding the group of pictures; and
   coding the individual picture based at least in part on the sample adaptive offset coding flag.

2. The method of claim 1, wherein the sample adaptive offset coding flag for the individual picture is set to off when the available coding bit limit is less than the first threshold and the quantization parameter is greater than the second threshold.

3. The method of claim 1, wherein the first threshold comprises an adaptive threshold based on a resolution of the individual picture.

4. The method of claim 1, wherein the individual picture comprises an I-picture, and setting the sample adaptive offset coding flag comprises setting the sample adaptive offset coding flag to on.

5. The method of claim 1, wherein the coding structure comprises a hierarchical B structure, the individual picture comprises a non-reference B-picture, and setting the sample adaptive offset coding flag comprises setting the sample adaptive offset coding flag to off.

6. The method of claim 1, wherein the coding structure comprises a hierarchical B structure, the individual picture comprises at least one of a B1-picture or a B2-picture, and setting the sample adaptive offset coding flag comprises setting the sample adaptive offset coding flag to off.

7. The method of claim 1, wherein the coding structure comprises a low delay coding structure and setting the sample adaptive offset coding flag for the individual picture comprises setting sample adaptive offset coding flags to the group of pictures at a fixed picture interval.

8. The method of claim 1, wherein the coding structure comprises an adaptive quantization parameter low delay coding structure and setting the sample adaptive offset coding flag for the individual picture comprises setting the flag to off when a high quantization parameter is associated with the individual picture and setting the flag to on when a low quantization parameter is associated with the individual picture.

9. The method of claim 1, wherein the sample adaptive offset coding flag is on, the method further comprising:
   determining the individual picture matches a reference picture associated with the individual picture; and
   setting the sample adaptive offset coding flag to off based on the determination the individual picture matches the reference picture.

10. The method of claim 1, wherein the sample adaptive offset coding flag is on, the method further comprising:
    determining, for a coding unit of the individual picture, at least one of a motion vector associated with the coding unit is a zero vector or a prediction residue associated with the coding unit is not greater than a third threshold; and
    setting a coding unit sample adaptive offset flag to off for the coding unit.

11. The method of claim 1, wherein the sample adaptive offset coding flag is on, the method further comprising:
    determining, for a coding unit of the individual picture, a motion vector associated with the coding unit is a zero vector and a second quantization parameter of a reference coding unit associated with the coding unit is not less than a third threshold; and
    copying sample adaptive offset parameters of the reference coding unit for the coding unit of the individual picture.

12. A system for video encoding comprising:
    a memory to store a group of pictures; and
    a processor coupled to the memory, the processor to determine, for an individual picture of the group of pictures, an available coding bit limit and a quantization parameter, to set a sample adaptive offset coding flag for the individual picture based at least in part on a comparison of the available coding bit limit to a first threshold and the quantization parameter to a second threshold, wherein, when the available coding bit limit is not less than the first threshold or the quantization parameter is not greater than the second threshold, the processor to set the sample adaptive offset coding flag for the individual picture comprises the processor to set the sample adaptive offset coding flag based at least in part on a coding structure associated with coding the group of pictures, and to code the individual picture based at least in part on the sample adaptive offset coding flag.

13. The system of claim 12, wherein the coding structure comprises a hierarchical B structure, the individual picture comprises a non-reference B-picture, and the processor to set the sample adaptive offset coding flag comprises the processor to set the sample adaptive offset coding flag to off.

14. The system of claim 12, wherein the coding structure comprises a low delay coding structure and the processor to set the sample adaptive offset coding flag for the individual picture comprises the processor to set sample adaptive offset coding flags to the group of pictures at a fixed picture interval.

15. The system of claim 12, wherein the coding structure comprises an adaptive quantization parameter low delay coding structure and the processor to set the sample adaptive offset coding flag for the individual picture comprises the processor to set the flag to off when a high quantization parameter is associated with the individual picture and set the flag to on when a low quantization parameter is associated with the individual picture.

16. The system of claim 12, wherein the sample adaptive offset coding flag is on, and the processor is further to determine, for a coding unit of the individual picture, a motion vector associated with the coding unit is a zero vector and a second quantization parameter of a reference coding unit associated with the coding unit is not less than a third threshold and copy sample adaptive offset parameters of the reference coding unit for the coding unit of the individual picture.

17. The system of claim 12, wherein the processor is to set the sample adaptive offset coding flag for the individual picture to off when the available coding bit limit is less than the first threshold and the quantization parameter is greater than the second threshold.

18. The system of claim 12, wherein the individual picture comprises an I-picture, and the processor to set the sample adaptive offset coding flag comprises the processor to set the sample adaptive offset coding flag to on.

19. The system of claim 12, wherein the coding structure comprises a hierarchical B structure, the individual picture comprises at least one of a B1-picture or a B2-picture, and the processor to set the sample adaptive offset coding flag comprises the processor to set the sample adaptive offset coding flag to off.

20. The system of claim 12, wherein the sample adaptive offset coding flag is on and the processor is further to determine, for a coding unit of the individual picture, a motion vector associated with the coding unit is a zero vector and a second quantization parameter of a reference coding unit associated with the coding unit is not less than a third threshold and to copy sample adaptive offset parameters of the reference coding unit for the coding unit of the individual picture.

21. At least one non-transitory machine readable medium comprising a plurality of instructions that, in response to being executed on a computing device, cause the computing device to perform video coding by:
 determining, for an individual picture of a group of pictures, an available coding bit limit and a quantization parameter;
 setting a sample adaptive offset coding flag for the individual picture based at least in part on a comparison of the available coding bit limit to a first threshold and the quantization parameter to a second threshold, wherein, when the available coding bit limit is not less than the first threshold or the quantization parameter is not greater than the second threshold, setting the sample adaptive offset coding flag for the individual picture comprises setting the sample adaptive offset coding flag based at least in part on a coding structure associated with coding the group of pictures; and
 coding the individual picture based at least in part on the sample adaptive offset coding flag.

22. The machine readable medium of claim 21, wherein the coding structure comprises a hierarchical B structure, the individual picture comprises a non-reference B-picture, and setting the sample adaptive offset coding flag comprises setting the sample adaptive offset coding flag to off.

23. The machine readable medium of claim 21, wherein the coding structure comprises a low delay coding structure and setting the sample adaptive offset coding flag for the individual picture comprises setting sample adaptive offset coding flags to the group of pictures at a fixed picture interval.

24. The machine readable medium of claim 21, wherein the coding structure comprises an adaptive quantization parameter low delay coding structure and setting the sample adaptive offset coding flag for the individual picture comprises setting the flag to off when a high quantization parameter is associated with the individual picture and setting the flag to on when a low quantization parameter is associated with the individual picture.

25. The machine readable medium of claim 21, wherein the sample adaptive offset coding flag is on, the machine readable medium comprising further instructions that, in response to being executed on the computing device, cause the computing device to perform video coding by:
 determining, for a coding unit of the individual picture, a motion vector associated with the coding unit is a zero vector and a second quantization parameter of a reference coding unit associated with the coding unit is not less than a third threshold; and
 copying sample adaptive offset parameters of the reference coding unit for the coding unit of the individual picture.

* * * * *